United States Patent [19]
Nelson

[11] Patent Number: 5,255,873
[45] Date of Patent: Oct. 26, 1993

[54] FLYING WING SPACE LAUNCH ASSIST STAGE

[76] Inventor: Robert L. Nelson, 26005 Todd La., Los Altos Hills, Calif. 94022

[21] Appl. No.: 962,966

[22] Filed: Oct. 19, 1992

[51] Int. Cl.$^5$ .......................... B64G 1/14; B64G 1/62; F42B 10/00

[52] U.S. Cl. ...................... 244/63; 244/3.25; 244/36; 244/160

[58] Field of Search .............. 244/3.25, 3.23, 3.24, 244/158, 160, 162, 35 R, 35 A, 36, 63, 45 R

[56] References Cited

U.S. PATENT DOCUMENTS

| | | | |
|---|---|---|---|
| 2,992,794 | 7/1961 | Boyd | 244/63 |
| 3,289,974 | 12/1966 | Cohen et al. | 244/162 |
| 3,437,285 | 4/1969 | Manfredi et al. | 244/63 |
| 3,700,193 | 10/1972 | Bradley | 244/162 |
| 3,702,688 | 11/1972 | Faget | 244/36 |
| 4,265,416 | 5/1981 | Jackson et al. | 244/63 |
| 4,802,639 | 2/1989 | Hardy et al. | 244/160 |
| 5,143,327 | 9/1992 | Martin | 244/158 R |

FOREIGN PATENT DOCUMENTS

| | | | |
|---|---|---|---|
| 348052 | 9/1960 | France | 244/63 |
| WO89582 | 9/1989 | PCT Int'l Appl. | 244/63 |

Primary Examiner—F. J. Bartuska
Assistant Examiner—Virna Lissi Ansley

[57] ABSTRACT

An unpowered reusable flying wing glider employed in conjunction with an aerodynamically shaped spacecraft without wings so as to permit existing airfield launch and ascent to orbit for a rocket engine takeoff thrust to vehicle weight ratio of less than 1. After an optimum climb angle is established and before wing weight and wing drag degrade performance, the wing is released for a glide return to the launch site. The flying wing zero stage would contain tank(s) for fuel or fuel and oxidizer so that at wing release, the spacecraft tanks are full or nearly full for the continuing trajectory to orbit.

2 Claims, 5 Drawing Sheets

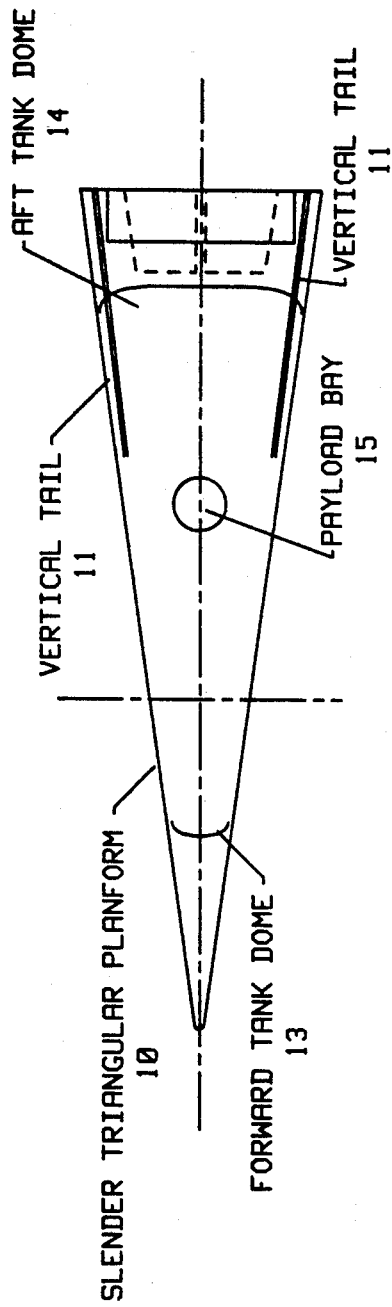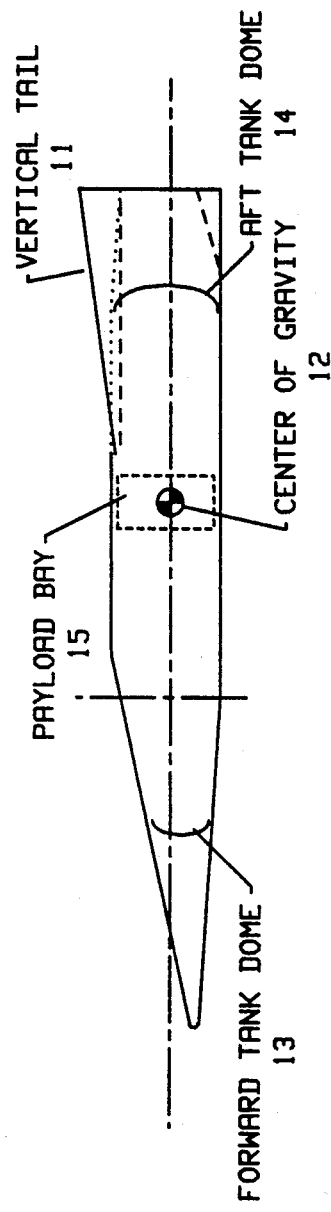

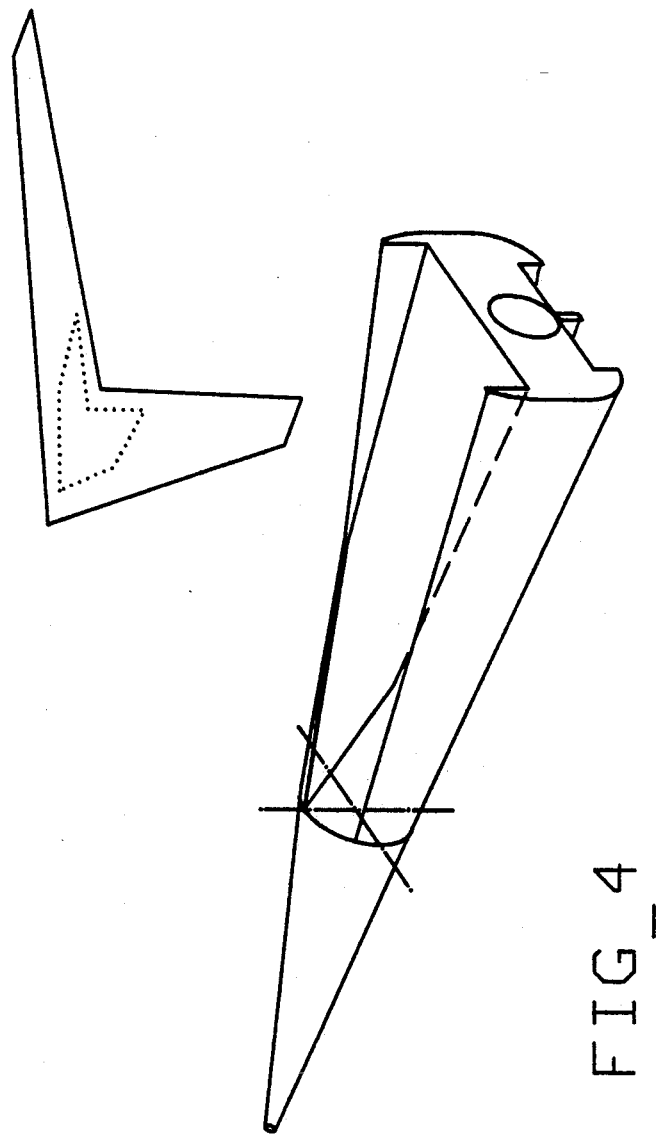
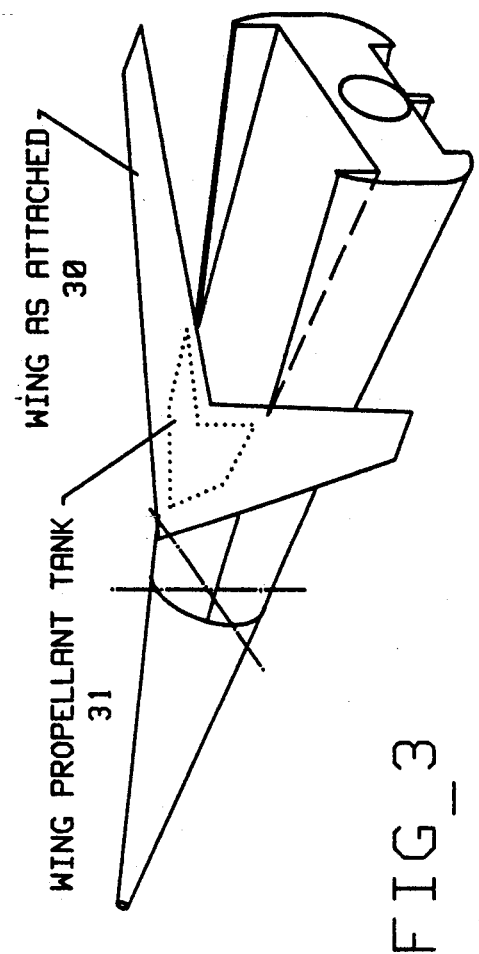
FIG_3
FIG_4

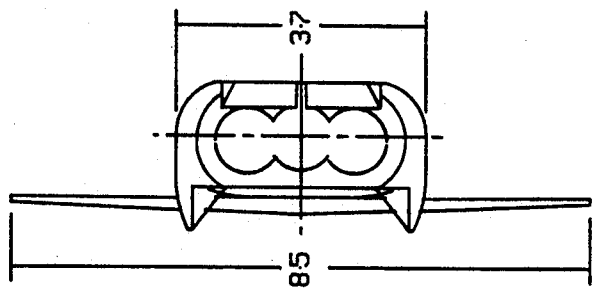
FIG_7
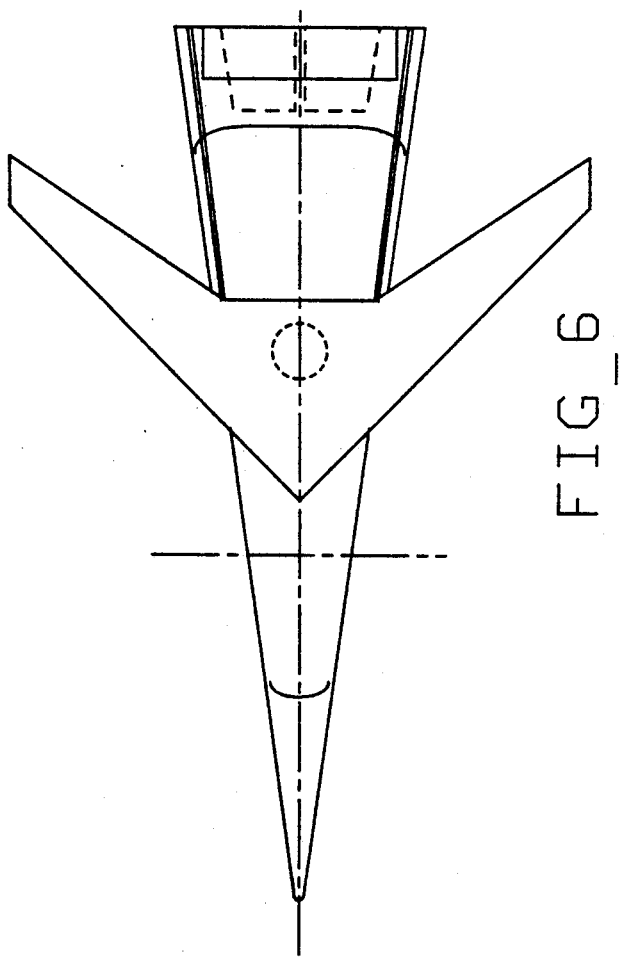
FIG_6
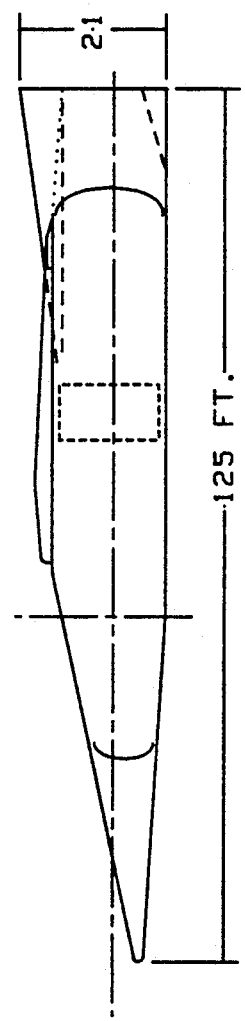
FIG_5

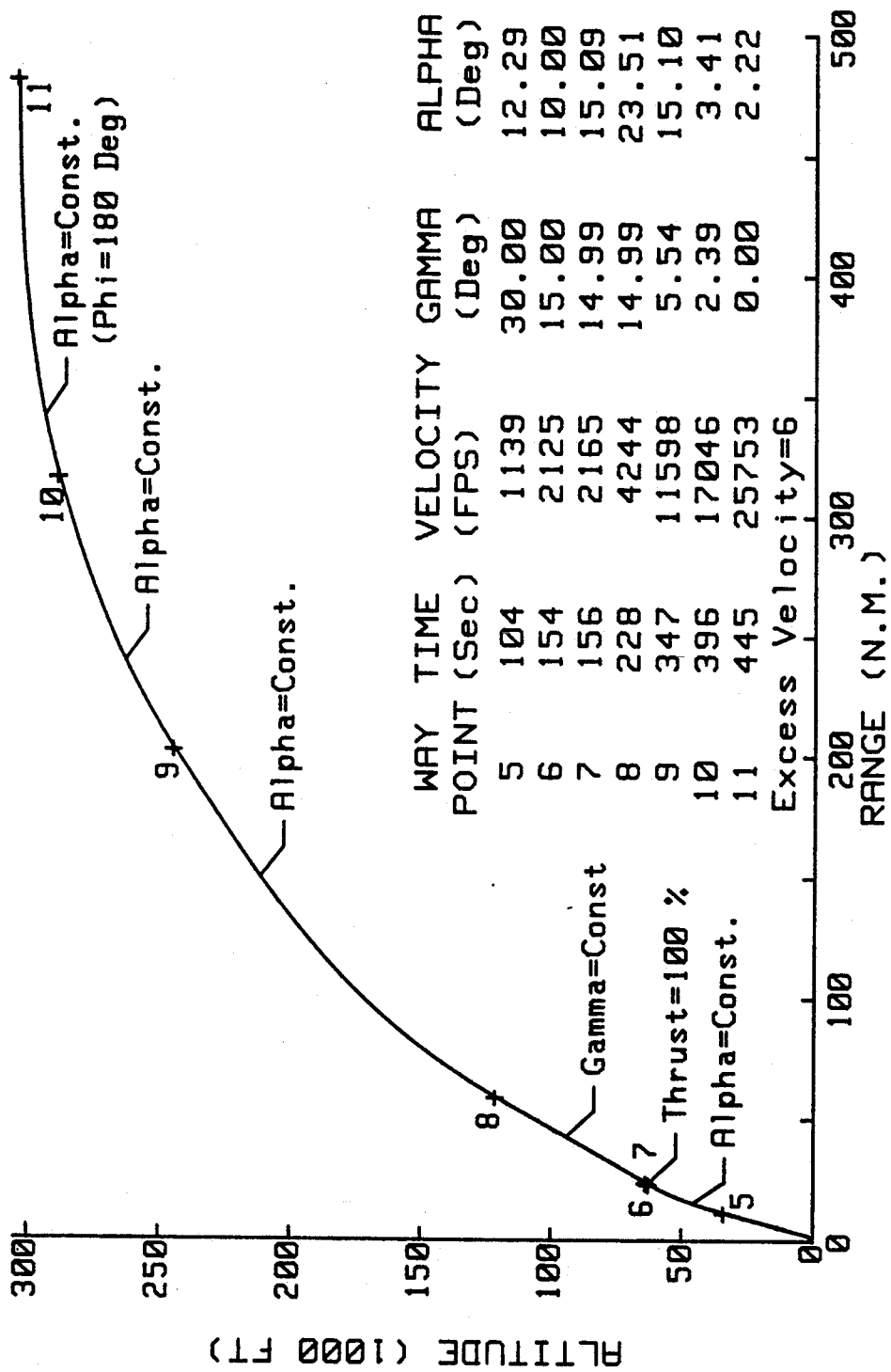
FIG_8

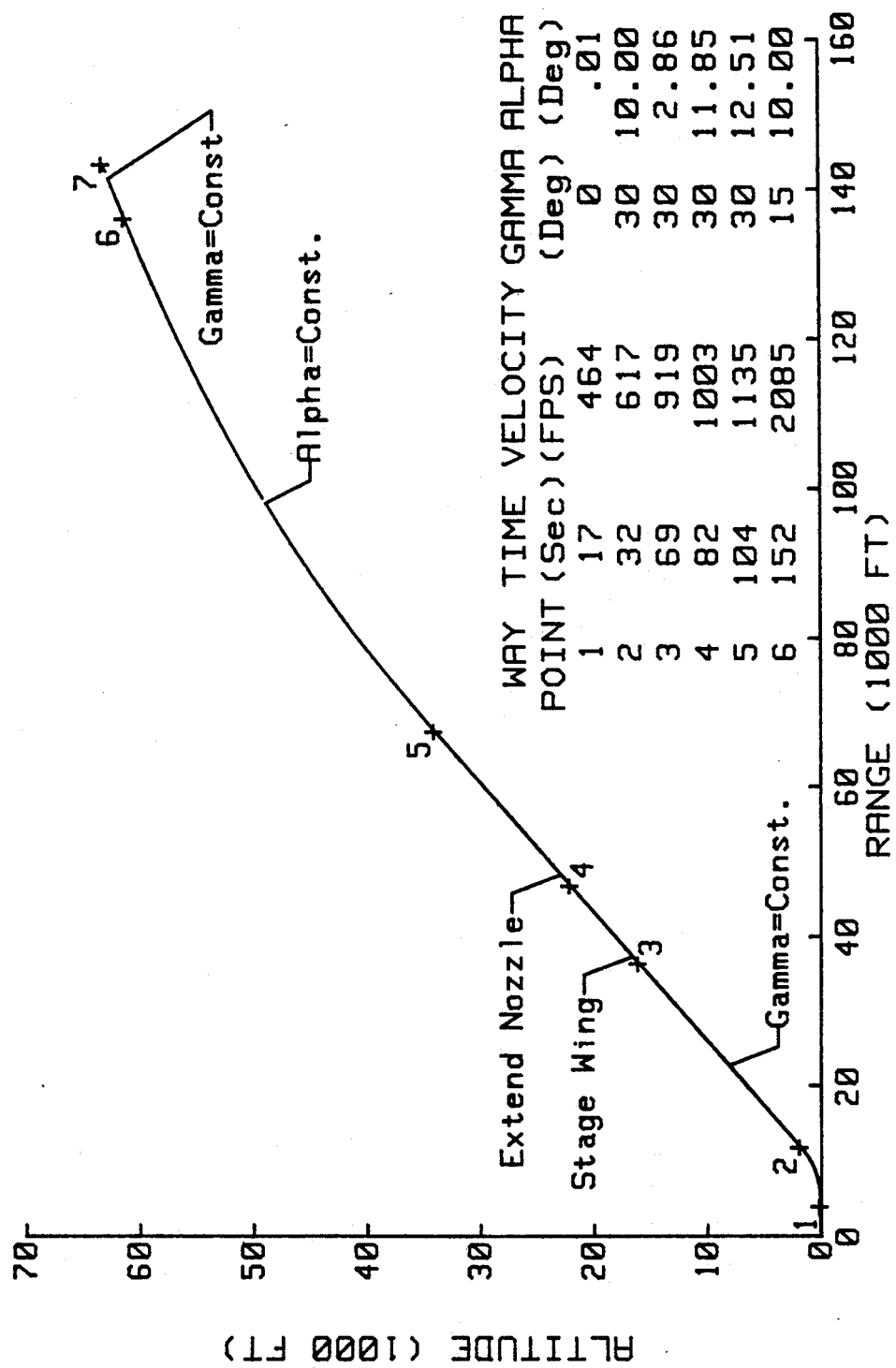
FIG_9

FLYING WING SPACE LAUNCH ASSIST STAGE

BACKGROUND OF THE INVENTION

The lack of low-cost access to orbit is the greatest detriment to the near-term exploitation of space. The ability to deliver payloads to orbit for substantially less than $5,000 per pound is yet to be realized. This results from the expendable nature of the current stable of space launch vehicles. The space shuttle being a combined space launch vehicle and manned orbital laboratory and workshop, while reusable, represents a more costly approach to payload delivery. Analysis of actual space launch vehicle delivery costs to date indicate that both the vehicle costs and the mode of space operations must be modified.

Numerous conceptual design studies have been performed since the mid-1960's, attempting to find a solution but none (other than the partially reusable space shuttle) have demonstrated sufficient cost leverage and utility to move forward into development. All the fully reusable concepts produced very large vehicles or lacked adequate credibility. The current U.S. main effort is the National Aerospace Plane (NASP) which would employ slush liquid hydrogen fuel and atmospheric oxygen as the propellant. Results to date indicate that advanced technology is required in all technical disciplines and vehicle systems especially in the combined-cycle engine. Because of the low density of the hydrogen fuel and drag losses from the required flight in the atmosphere, the resulting airframe is quite large.

The challenge facing the reusable single-stage chemical rocket space-launch vehicle designer is illustrated in a relationship derived from the rocket equation expressed as:

$$\Delta V = g \times Isp \times \log(W_{initial}/W_{final})$$

where $\Delta V$ is the velocity delivered by the rocket engine to achieve orbit, g is the acceleration of gravity, and Isp is the specific impulse of the rocket engine.

Assuming $\Delta V$ (including all losses) = 32,500 feet/sec., vacuum Isp = 460 sec. for a liquid oxygen-liquid hydrogen engine, and a fixed payload weight = 10,000 lbs., the following relationship for the launch weight results:

$$W_{launch} = 90,000 \times [(W_{empty}/W_{payload})_{min} + \Delta W_{empty}/W_{payload} + 1]$$

where $W_{empty}$ is the vehicle burnout weight at orbit insertion for no payload, and $\Delta W_{empty}$ represents the weight increment attributed to a non-optimal concept. The weight $\Delta W_{empty}$ includes both the weight of the non-optimal subsystem carried into and returned from orbit and the vehicle empty weight growth resulting from the added propellant and engine thrust required. An example would be the wing required for airfield takeoff but not required for reentry and landing. The feasibility and cost of the fully reusable space launch vehicle is directly dependent on the vehicle empty to payload weight ratio. For a value of 20, a 2 million pound launch weight is indicated and an empty weight growth of 5 percent for launch weight fixed drops the payload weight to zero. For system feasibility, a vehicle empty weight to payload weight ratio of 10 or less is probably required. One suggested approach would follow the vertical launch technique and rely on advanced materials technology to reduce the empty to payload weight ratio to about 10. However, this approach is paced by the availability of advanced technology development resources. A more challenging problem for the designer is to search for configuration options and mode of flight options that can make for a near-term, low-cost solution. (The classic example of this type of approach was the discovery and implementation of lunar orbit rendezvous which made possible manned landing on the moon in the 1960's). In all probability, more than one breakthrough together with favorable synergism between concepts will be necessary. One recent example of a new approach put into practice was the successful flight of the small Pegasus space launch vehicle which employed a B52 aircraft as the first stage which dropped a three-stage vehicle having a winged initial stage to provide an aerodynamic turn to transition from horizontal to climbing flight. Many studies exploring aircraft launch have been conducted for large payload space launch vehicles mainly to exploit the flexibility of an airfield launch site. The primary stumbling block has been the lack of a suitable heavy payload launch aircraft.

SUMMARY OF THE INVENTION

It is the object of the present invention to contribute substantially to the reduction of the cost of delivery of payloads to orbit through reuse of launch vehicle components.

Another objective is to provide a fully reusable launch assist zero stage to make possible airfield takeoff of a space launch vehicle without degradation of orbital payload weight capability.

A further objective is to contribute to improved efficiency and launch cost reduction of the space launch vehicle if designed for and operated in the expendable mode.

These and other objects are provided through the utilization of an unpowered reusable flying wing glider zero stage (the subject of this invention) in conjunction with an aerodynamically shaped configuration without wings. The wing is sized for takeoff from existing airfield runways. After an optimum climb angle is established and before wing weight and wing drag degrade performance, the wing is released for a glide return to the launch site. An undercarriage is utilized to support the configuration during the ground roll and is released at the takeoff point. The undercarriage concept applies the prior art employed operationally by the ME163 rocket interceptor aircraft of WWII vintage. The flying wing zero stage would contain tank(s) for fuel or fuel and oxidizer so that at wing release, the spacecraft tanks are full or nearly full for the trajectory to orbit.

BRIEF DESCRIPTIONS OF THE DRAWINGS

FIG. 1 shows a top view of a space launch vehicle having aircraft-like flight characteristics.

FIG. 2 shows a side view of the flight vehicle of FIG. 1.

FIG. 3 shows a wing mounted on the top side of the flight vehicle of FIG. 1.

FIG. 4 shows the system of FIG. 3 following release of the wing.

FIG. 5 shows a side view of the wing-space launch vehicle configuration for the system performance calculation.

FIG. 6 shows a top view of the wing-space launch vehicle configuration for the system performance calculation.

FIG. 7 shows a rear view of the wing-space launch vehicle configuration for the system performance calculation.

FIG. 8 shows the altitude plotted against range for the trajectory to orbit calculation.

FIG. 9 shows the altitude plotted against range for the low altitude phase of the trajectory to orbit calculation.

DESCRIPTION OF THE PREFERRED EMBODIMENT

Referring now to the drawings and in particular to FIG. 1, and FIG. 2, consider a rocket-powered space launch vehicle configuration shaped to have aircraft-like flight characteristics. Since wings are absent, this type shape is referred to by those familiar with the art as a lifting body. The slender triangular planform 10, the twin toed-in vertical tails 11, and a center of gravity 12, slightly forward of the center of planform area, all contribute to low supersonic-hypersonic drag, aerodynamic stability, and aerodynamic lift for re-entry energy management and for a runway-type landing. Rocket propellant is contained between the forward tank dome 13 and the aft tank dome 14. The rocket engine (not shown) and aerodynamic controls would occupy space between aft tank dome and vehicle base. Other flight systems and personnel would be located in front of the forward tank dome. A payload bay 15 would be located at the flight center of gravity. As is obvious from the drawings, propellant tankage dominates the vehicle configuration. As is the case for all expendable space launch vehicles, the propellant tankage for this configuration would be employed as primary airframe structure. For recovery and reuse, heat shielding would be required over the entire vehicle.

This type of lifting body arrangement is expected to have a vehicle empty weight to vehicle payload weight ratio between 5 and 6 for a payload weight of 10,000 pounds and thus a launch weight of between 550,000 and 650,000 pounds using the relationship and for the parameters presented earlier. For vertical launch, this would require an initial engine thrust level of between 660,000 and 780,000 pounds. So as to avoid paying the penalty of carrying takeoff thrust engines to the upper stage staging point or to orbit, it is current practice to stage liquid rocket engines (Atlas) or employ solid rocket boost (Delta/Titan). While providing flexible payload growth capability to the launch system, this practice contributes substantially to the payload to orbit delivery cost.

An elegant alternative to this approach is offered by providing airfield runway takeoff capability to the described lifting body space launch vehicle through addition of a wing sized for takeoff and the low altitude climbout trajectory. Referring next to FIG. 3, the wing 30 is attached to the upper surface of the primary spacecraft. Fuel and oxidizer or oxidizer only is contained in a wing tank 31. The wing would be shaped and located so as to not require additional surfaces on the spacecraft for safe and stable flight.

FIG. 4 shows the wing and the spacecraft shortly after wing release. The wing would have the shaping, aerodynamic control surfaces, and automatic controls for a glide return to the airfield launch site following the prior art demonstrated by the Northrup flying wing aircraft of WWII and post-WWII vintage and the B2 bomber.

The leverage afforded by the invention is best seen through the examination of the ascent to orbit performance it provides. Trajectory simulations leading to a near optimum solution employed the wing-lifting body configuration of FIG. 5, FIG. 6 and FIG. 7. The assumed payload weight of 10,000 LBM for a 50 N.M. polar orbit sets the overall configuration size. The resulting parameters for the calculation reflect current state of the technology. For the spacecraft delivered to orbit and returned to earth, the empty weight not including payload is approximately 50,000 LBM. The liquid oxygen-liquid hydrogen propellant weight is 525,000 LBM. The wing empty weight is 15,000 LBM. The wing propellant weight is 25,000 LBM. The ratio of wing lift to body lift at takeoff equals 5 and the ratio of rocket engine thrust to total configuration weight at takeoff is 0.84. Rocket engine thrust and weight are representative of a single installed space shuttle main engine (SSME). Spacecraft aerodynamic parameters for the simulations reflect wind tunnel test data from subsonic speeds to a Mach number of 5 and theoretical predictions above a Mach number of 5. Wing aerodynamic properties follow from lifting-line theory.

FIG. 8 shows that as defined the vehicle does indeed possess orbital capability. Way points shown by sequential numbers and symbols on the ascent profile identify where steering commands and rocket motor parameters are modified. At orbit insertion, the excess velocity (not including propellant reserves) is 7 feet per second. The performance losses (drag, gravity, thrust atmospheric and steering) total 5,860 feet per second. A further indication of the value of the subject space launch vehicle combination is gained by examining the weight allocation for reentry heat shielding and runway landing. If this weight was transferred to payload assuming the spacecraft is expendable, the 10,000 LBM payload would nearly double. In perspective, cutting the payload in half to make possible reuse represents a good tradeoff.

The value of the subject invention is better understood by examination of the low altitude ascent trajectory shown in FIG. 9. Following a ground roll of 4,000 feet, the vehicle takes off (way point 1) with a rotation speed of 280 knots and performs a constant near maximum lift-to-drag ratio turn to 30 degree flight path angle (way point 2) and holds this near optimum climb angle through transonic speeds. While not tested to be an optimum release point, the wing is staged (way point 3) at a Mach number of 0.9 to avoid the wing transonic drag rise. At this staging point, the remaining lifting body space launch vehicle has adequate lift to hold the flight path and has low enough drag to accelerate through the transonic speed range and continue to orbit. In contrast, a comparable vertical launch vehicles following a steeper low altitude flight path and requires about 40 percent more takeoff thrust.

Accordingly, a system for airfield launching of space vehicles has been described. Clearly the subject invention may be modified both in design and application by those skilled in the art without departing from the scope of the appended claims.

What is claimed is:

1. A system and process contributing to improving the efficiency and cost reduction of the delivery of payloads to orbit by making possible airfield runway takeoff of the delivery spacecraft, the system and process comprising:

(a) a wing without boast propulsion, attached to the upper surface of the delivery vehicle and sized for takeoff and climbout of the combined system;

(b) the wing released intact after takeoff at a point in the climbout when the spacecraft has the necessary aerodynamic lift and acceleration to continue to orbit, (c) the wing having the shaping, appendages and controls to support stable controlled flight of the combined spacecraft-wing system;

(d) the wing having additional shaping, appendages, together with automatic control and communications required for safe separation from the spacecraft, and gliding, unmanned controlled flight back to the takeoff airfield.

2. The wing system of claim 1 wherein the wing contains tankage for oxidizer and fuel or oxidizer only for spacecraft rocket motor operation while attached.

* * * * *